(12) United States Patent
Dennis et al.

(10) Patent No.: US 7,973,837 B2
(45) Date of Patent: Jul. 5, 2011

(54) IMAGE SENSOR HAVING A PIXEL ARRAY AND ASSOCIATED METHOD

(75) Inventors: Carl Dennis, Edinburgh (GB); Gilles Dufaure De Lajarte, Edinburgh (GB)

(73) Assignee: STMicroelectronics Ltd., Marlow-Buckinghamshire (GB)

( * ) Notice: Subject to any disclaimer, the term of this patent is extended or adjusted under 35 U.S.C. 154(b) by 1440 days.

(21) Appl. No.: 11/330,637

(22) Filed: Jan. 12, 2006

(65) Prior Publication Data
US 2006/0170801 A1    Aug. 3, 2006

(30) Foreign Application Priority Data

Jan. 31, 2005 (EP) ..................... 05250518

(51) Int. Cl.
*H04N 9/64* (2006.01)
*H04N 5/217* (2011.01)

(52) U.S. Cl. ......................... 348/247; 348/241

(58) Field of Classification Search .......... 348/187–188, 348/241–251
See application file for complete search history.

(56) References Cited

U.S. PATENT DOCUMENTS

| 5,640,200 A * | 6/1997 | Michael ........................... 348/87 |
| 6,819,358 B1 * | 11/2004 | Kagle et al. ................... 348/246 |
| 6,965,395 B1 * | 11/2005 | Neter ............................. 348/129 |
| 6,967,317 B2 * | 11/2005 | Atmur ......................... 250/208.1 |
| 7,034,873 B2 * | 4/2006 | Mendis et al. ................. 348/246 |
| 2004/0174436 A1 * | 9/2004 | Miyahara et al. ............ 348/219.1 |
| 2005/0012824 A1 * | 1/2005 | Stavely et al. ............. 348/211.99 |
| 2005/0103981 A1 * | 5/2005 | Knee et al. ................. 250/208.1 |
| 2006/0033005 A1 * | 2/2006 | Jerdev et al. ............... 250/208.1 |

FOREIGN PATENT DOCUMENTS

| EP | 1206126 | 5/2002 |
| JP | 06296252 | 10/1994 |
| JP | 2001257930 | 9/2001 |
| JP | 2003219259 | 7/2003 |

\* cited by examiner

*Primary Examiner* — Kelly L Jerabek
(74) *Attorney, Agent, or Firm* — Lisa K. Jorgenson; Allen, Dyer, Doppelt, Milbrath & Gilchrist, P.A.

(57) ABSTRACT

An image sensor may have a pixel array and an imaging lens for forming an image on the pixel array. The sensor may also include a pixel readout unit for enabling individual pixel values to be readout. The sensor may further include a pixel selection unit wherein at least one pixel sub-array is selected according to the pixel values readout and the at least one sub-array is used for reading the image.

14 Claims, 2 Drawing Sheets

IMAGE SENSOR HAVING A PIXEL ARRAY AND ASSOCIATED METHOD

FIELD OF THE INVENTION

The invention relates to image sensors with a pixel array, and, in particular, to such image sensors having selectable sub-arrays.

BACKGROUND OF THE INVENTION

Devices containing image sensors, as a primary or secondary function, are now extremely common. For example, an optical mouse has an image sensor that allows the mouse to detect movement over a surface and many mobile cellular telephones have an integral camera. Image sensors that are used for these types of devices should generally be low cost and use components that minimize cost.

U.S. Pat. No. 6,763,157 discloses a system for utilizing a pixel array to receive data transmission from one or more optical fibers.

SUMMARY OF THE INVENTION

According to a first aspect, there is provided an image sensor that may have a pixel array and an imaging lens for forming an image on the pixel array. The sensor may further comprise a pixel readout unit or readout means for enabling individual pixel values to be readout and a pixel selection unit or selection means, wherein at least one pixel sub-array may be selected according to the pixel values readout with the at least one sub-array being used for reading the image. Preferably, pixels not selected in the at least one sub-array may not be read out, the readout unit or readout means thereby only reading out pixel values of the at least one sub-array.

Alternatively, pixels not selected in the at least one sub-array may be disconnected, the readout unit or readout means thereby only reading out pixel values of the at least one sub-array. Alternatively, pixels not selected in the at least one sub-array may have their pixel values ignored. Preferably, the pixel selection unit or selection means may maintain a map of selected pixels.

According to a second aspect, there is provided a method of selecting a pixel sub-array from an image sensor that may comprise a pixel array and an imaging lens. The method may comprise illuminating the pixel array with a set or predetermined illumination, reading out pixel values from the pixel array, and selecting a sub-array according to the pixel values from the set or predetermined illumination.

Preferably, the set or predetermined illumination may comprise a continuous, regular or predetermined illumination test pattern. Preferably, the predetermined illumination test pattern may comprise an image test chart with centration feature or features. Preferably, the image test chart may be a Local Contrast Normalization chart.

Preferably, the output from the pixel readout unit or readout means may also be utilized to focus the image sensor. Preferably, the sub-array may be selected according to expected pixel values for the set or predetermined illumination which may be the highest pixel values, the lowest pixel value, the predefined pixel values, or within a range of predefined pixel values.

According to a third aspect, there is provided a method of identifying "bad" pixels from an image sensor that may comprise a pixel array and an imaging lens. The method may comprise illuminating the pixel array with a set or predetermined illumination, reading out pixel values from the pixel array, and identifying pixels with excessive or decreased photo response. Preferably, the image sensor may store a map of the "bad" pixels to enable compensation of the output for the "bad" pixels.

According to a fourth aspect, there is provided an optical pointing device that may comprise an image sensor according to the first aspect. Preferably, the optical pointing device may comprise an optical mouse.

According to a fifth aspect, there is provided a mobile device that may comprise an image sensor according to the first aspect of the invention. Preferably, the mobile device may comprise at least one of a mobile cellular telephone, a camera, a portable computer, a personal digital assistant device, and a Web Cam.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

A typical image sensor may have a rectangular pixel array, usually with a 4:3 aspect ratio. Imaging lenses are typically circular and consequently form a circular image. To ensure that the output from an image sensor does not have redundant areas, the image sensor is designed so that the imaging lens forms an image that is larger than the pixel array.

Semiconductor chips are often pad-limited in size, that is, they should be a particular size for enabling connections to be made in the semiconductor package. This means that there can be additional space on the semiconductor chip. As pixel size has steadily decreased with advances in semiconductor technology, it is possible to have a larger pixel array than is required for an application. Furthermore, applications which do not pad-limit the size of the semiconductor chip can benefit from a larger than required pixel array due to cost savings in lens components, such as an imaging lens and lens holder, due to the improved tolerances of an image sensor in accordance with the invention.

Figure 1:
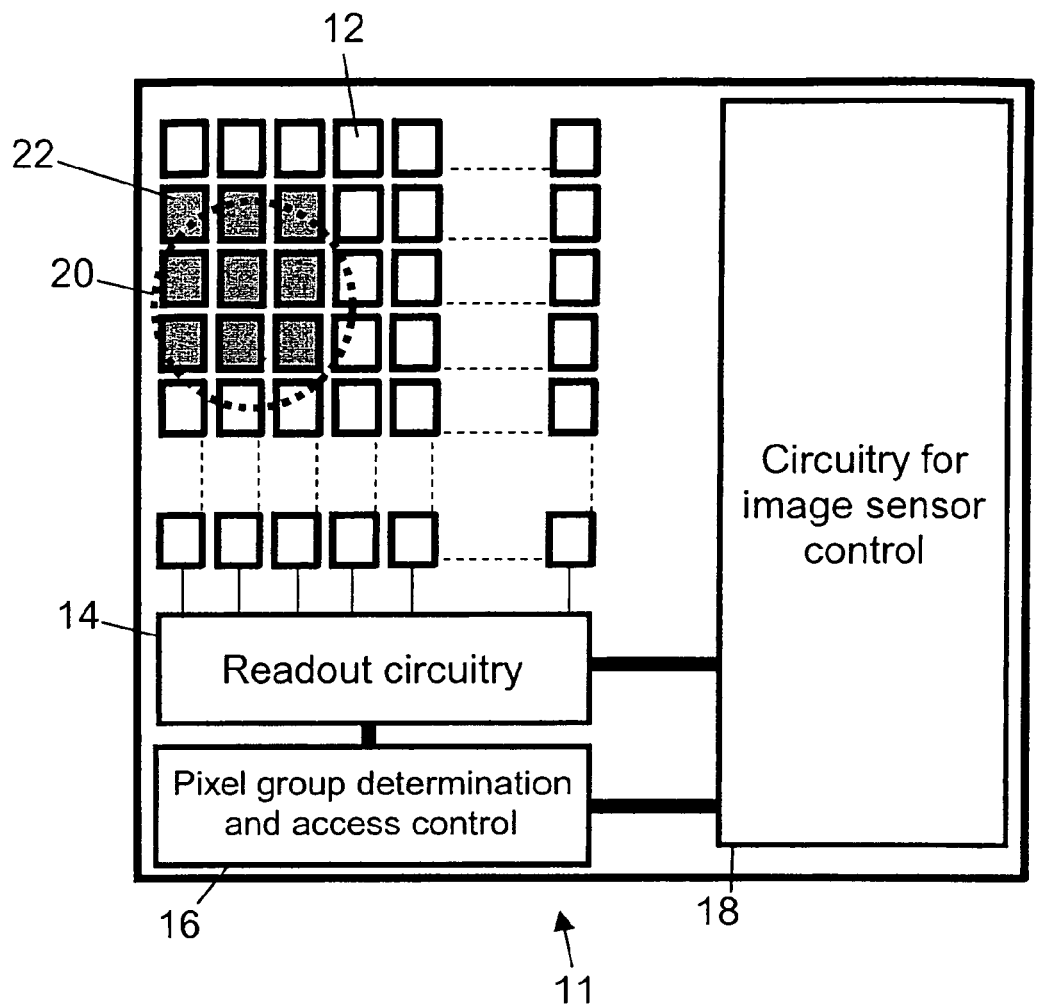
FIG. 1 illustrates an image sensor semiconductor package according to the invention.
Figure 2:
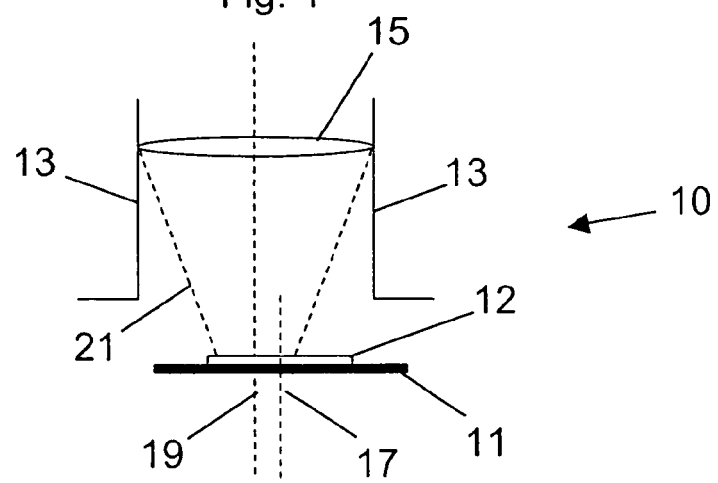
FIG. 2 illustrates an image sensor according to the invention including semiconductor package, imaging lens and lens holder.

Referring now to FIGS. 1 and 2, an image sensor 10 comprises a semiconductor image sensor package 11, a lens holder 13, and an imaging lens 15. The semiconductor image sensor package 11 comprises a pixel array 12, a pixel readout unit or readout means 14, a pixel selection unit or selection means 16, and control circuitry 18.

An image outline 20, formed by the imaging lens 15, is projected from the imaging lens 15 on to the pixel array 12. The imaging lens 15 has a focal length and a field of view such that the image outline 20 is smaller than the pixel array 12. The pixel array 12 has an array center 17 and the imaging lens 15 has a lens center 19.

In prior art systems, the pixel array 12 and the imaging lens 15 had to be aligned as closely as possible. The tolerance in prior art systems had to take into account imaging lens tilt, imaging lens to lens holder tolerances, and positioning of the lens holder in relation to semiconductor image sensor package 11.

In the sensor package 11, however, alignment of the array center 17 and lens center 19 is not crucial. The lens center 19 is found on the pixel array 12 during a system test. The system test may be during unit manufacture, system initialization, or periodically during normal operation. For example, the system test may be performed periodically during normal operation by raising the exposure level of a scene with a set or predetermined amount of light allowing an approximation of continuous illumination. A system test performed during manufacture is described below.

Figure 3:
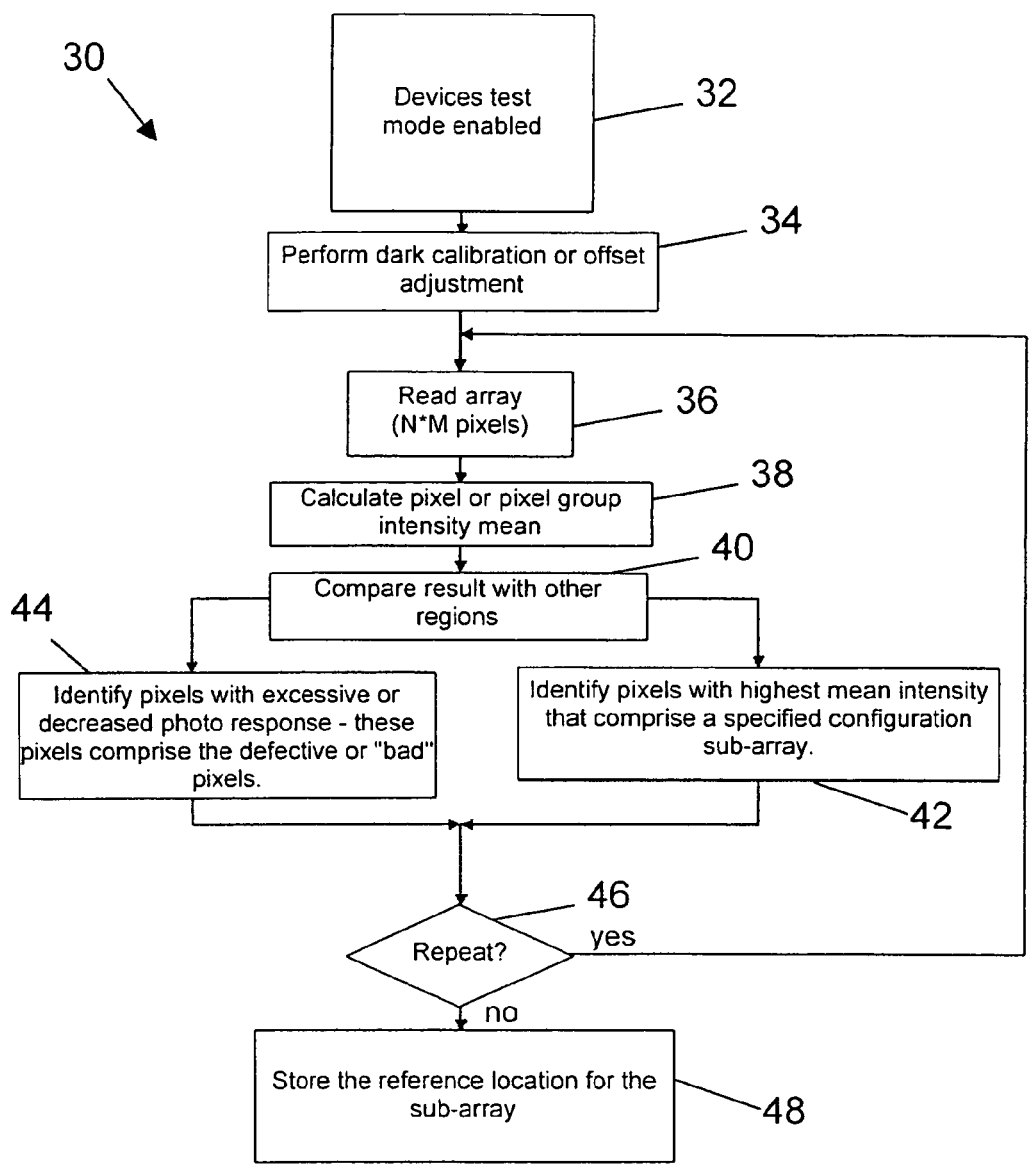
FIG. 3 illustrates a flow diagram of an image sensor sub-array pixel selection unit or selection means.

Referring to FIG. 3, the image sensor 10 undergoes a system test 30 during manufacture. Firstly, the image sensor enters a test mode 32 and then performs a dark calibration or offset adjustment 34.

At this stage the image sensor 10 is illuminated by a set or predetermined illumination. This may be a continuous illumination for a specified period or a regular pattern or predetermined image test chart with centration feature or features. For example, an image test chart could be a single dot on a uniform background, 2 features on an image axis (horizontal or vertical), a resolution chart or Local Contrast Normalization (LCN) chart, as defined by the Standard Mobile Imaging Architecture (SMIA). Using a LCN chart is particularly advantageous as an image sensor is typically illuminated with a LCN chart during manufacture to allow the imaging lens to be correctly focused on the pixel array. The output from the LCN chart could also be directed towards the system test for identifying a sub-array.

The system test 30, in this case, uses a continuous white illumination. The entire pixel array 12, using the pixel readout unit or readout means 14, is read out in a read step 36. In a calculation step 38, the pixel selection unit or selection means 16 analyzes the pixel values of each pixel or a predetermined size group of pixels of the pixel array 12 to identify the pixel intensity mean. Then, during a comparison step 40, the pixel intensity means are compared and an identification step 42 identifies pixels with the highest mean intensity that comprise a predetermined sub-array size. For example, the predetermined sub-array could be a VGA (640×480) sub-array within a pixel array 12, which is a SVGA (800×600) array.

In alternative embodiments, the steps 38 to 42 may use other methods to identify the sub-array of interest, which may be highest value, lowest value, predetermined value or within a predetermined range of values. The system test 30 also performs a "bad" pixel identification step 44. The step 44 identifies pixels with excessive or decreased photo response, as these pixels comprise the defective or "bad" pixels.

If required, a repeat step 46 can repeat steps 36 to 42/44 two to N times. The results from the repetition can then be averaged to reduce noise and improve accuracy.

A final store step 48 stores the location of the identified sub-array 22. The store can be performed using external memory, internal memory or on-die fuses. The location of selected pixels and defective pixels can be stored using a map that may be run-length encoded map.

Once the sub-array 22 has been selected for operation, unused pixels are disconnected, their values are ignored or they are simply not addressed during readout. In this example, the pixel selection unit or selection means is preconfigured to select a 3 by 3 square of pixels and consequently, as shown in FIG. 1, selects a sub-array 22. In this case, the sub-array 22 represents the area of pixels that have responded as expected to the set or predetermined illumination.

As the pixel array 12 is larger than the image outline 20, the tolerances required to position the imaging lens are not required to be as small as if the pixel array 12 was the same size or smaller than the image outline 20. The typical alignment tolerance of a prior-art image sensor is in the region of ±200 µm between the image sensor semiconductor package, the imaging lens and lens holder. With an image sensor as described herein, an alignment tolerance of ±10 µm can be achieved between the image sensor semiconductor package, the imaging lens and lens holder using the same imaging lens and lens holder. This is due to the alignment of the center of the sub-array 22 being calibrated after the image sensor has been manufactured and is facilitated by the pixel array 12 being larger than the size of the image 20.

As such, the imaging lens can be integrated into a low-cost package with resultant cost savings. Furthermore, the selectable sub array will enable the maximum yield to be obtained; avoid accurate lens to array positioning; and improve image quality by enabling the region with the optimum relative illumination to be utilized.

In addition, the pixel selection unit or selection means 12 may also identify pixel values that are inconsistent with surrounding pixels. These inconsistent pixel values may be identified as "bad" pixels. The pixel selection unit or selection means can maintain a map of bad pixels, which allows them to be better compensated for, thus improving the manufacturing yield.

Improvements and modifications may be incorporated without departing from the scope of the invention.

That which is claimed is:

1. An image sensor comprising:
    a pixel array;
    an imaging lens to form an image on said pixel array, with the image having an outline that is smaller than an outline of said pixel array;
    a pixel readout unit to enable individual pixel values to be read out from said entire pixel array during a system test; and
    a pixel selection unit to select at least one pixel sub-array for reading the image based upon the read individual pixel values so that a center of the at least one pixel sub-array is aligned with a center of said imaging lens, wherein said pixel readout unit, subsequent to the system test, only reads out pixel values from the at least one pixel sub-array.

2. The image sensor according to claim 1 wherein said pixel selection unit maintains a map of pixels.

3. The image sensor according to claim 1 wherein said pixel array, said imaging lens, said pixel readout unit and said pixel selection unit are configured as part of an optical pointing device.

4. The image sensor according to claim 1, wherein said pixel selection unit disconnects pixels not selected in the at least one sub-array.

5. An electronic device comprising:
    a pixel array;
    an imaging lens to form an image on said pixel array, with the image having an outline that is smaller than an outline of said pixel array;
    a pixel readout unit to enable individual pixel values to be read out from said entire pixel array during a system test; and
    a pixel selection unit to maintain a map of at least one pixel sub-array for reading the image based upon the read individual pixel values so that a center of the at least one pixel sub-array is aligned with a center of said imaging lens, wherein said pixel readout unit, subsequent to the system test, only reads out pixel values from the at least one pixel sub-array.

6. The electronic device according to claim 5 wherein said pixel array, imaging lens, pixel selection unit and pixel readout unit define a mobile device comprising at least one of a mobile cellular telephone, a camera, a portable computer, a personal digital assistant, and a Web Cam.

7. The electronic device according to claim 5 wherein said pixel selection unit disconnects pixels not selected in the at least one sub-array.

8. A method of selecting a pixel sub-array from an image sensor comprising a pixel array and an imaging lens to form an image on the pixel array, with the image having an outline that is smaller than an outline of the pixel array, the method comprising:

illuminating the pixel array with a set illumination during a system test;

reading out individual pixel values from the entire pixel array during the system test;

selecting a pixel sub-array for reading the image based upon the read individual pixel values so that a center of the at least one pixel sub-array is aligned with a center of the imaging lens; and subsequent to the system test, only reading out pixel values from the at least one pixel sub-array.

9. The method according to claim 8 wherein the set illumination comprises at least one of a continuous test pattern, a regular test pattern, and a predetermined illumination test pattern.

10. The method according to claim 9 wherein the predetermined illumination test pattern comprises an image test chart with at least one centration feature.

11. The method according to claim 10 wherein the image test chart comprises a Local Contrast Normalization chart.

12. The method according to claim 8 wherein the image sensor further comprises a pixel readout unit; and further comprising using the pixel readout unit to generate an output to focus the image sensor.

13. The method according to claim 8 wherein the pixel sub-array is selected according to expected pixel values for the set illumination which is at least one of the highest pixel values, the lowest pixel value, predefined pixel values, and within a range of predefined pixel values.

14. The method according to claim 8 further comprising disconnecting the pixels not selected in the at least one sub-array.

* * * * *